US009686722B2

(12) United States Patent
Yoon et al.

(10) Patent No.: US 9,686,722 B2
(45) Date of Patent: Jun. 20, 2017

(54) METHOD AND DEVICE FOR ACCOUNTING IN WIFI ROAMING BASED ON AC AND AP INTERWORKING

(75) Inventors: Joo Young Yoon, Seoul (KR); Kyu Jeong Han, Suwon-si (KR); Yung Ha Ji, Seongnam-si (KR)

(73) Assignee: KT Corporation, Seongnam-si (KR)

( * ) Notice: Subject to any disclaimer, the term of this patent is extended or adjusted under 35 U.S.C. 154(b) by 167 days.

(21) Appl. No.: 14/345,146

(22) PCT Filed: Oct. 19, 2011

(86) PCT No.: PCT/KR2011/007774
§ 371 (c)(1),
(2), (4) Date: Mar. 14, 2014

(87) PCT Pub. No.: WO2013/039277
PCT Pub. Date: Mar. 21, 2013

(65) Prior Publication Data
US 2014/0341185 A1 Nov. 20, 2014

(30) Foreign Application Priority Data

Sep. 16, 2011 (KR) ........................ 10-2011-0093277

(51) Int. Cl.
*H04W 36/00* (2009.01)
*H04W 12/06* (2009.01)
(Continued)

(52) U.S. Cl.
CPC ..... *H04W 36/0038* (2013.01); *H04L 12/1403* (2013.01); *H04L 63/0892* (2013.01);
(Continued)

(58) Field of Classification Search
CPC . H04L 12/1403; H04L 63/0892; H04L 63/08; H04L 63/10; H04M 15/8038;
(Continued)

(56) References Cited

U.S. PATENT DOCUMENTS 7,460,855 B2   12/2008  Barkley et al.
8,218,512 B2 *  7/2012  Yaqub ................... H04L 63/062
                                                               370/331
(Continued)

FOREIGN PATENT DOCUMENTS

KR   10-2003-0075798 A   9/2003
KR   10-2003-0083941 A   11/2003
(Continued)

OTHER PUBLICATIONS

International Search Report for PCT/KR2011/007774 dated Sep. 27, 2012.

*Primary Examiner* — Charles C Jiang
*Assistant Examiner* — Oussama Roudani
(74) *Attorney, Agent, or Firm* — Sughrue Mion, PLLC

(57) ABSTRACT

A WiFi roaming method and device which perform an authentication and accounting process once for multiple APs, thereby reducing the load of an authentication server (RADIUS) in a WiFi roaming method, which separates a terminal session management function and a traffic control function by a access controller and a access point interworked with a tunneling method according to a CAPWAP (Control and Provisioning of Wireless Access Points) protocol.

22 Claims, 4 Drawing Sheets

(51) Int. Cl.
*H04L 29/06* (2006.01)
*H04M 15/00* (2006.01)
*H04W 8/02* (2009.01)
*H04W 4/24* (2009.01)
*H04W 8/12* (2009.01)
*H04L 12/14* (2006.01)
*H04W 84/12* (2009.01)
*H04W 36/14* (2009.01)

(52) U.S. Cl.
CPC ... *H04M 15/8038* (2013.01); *H04M 15/8083* (2013.01); *H04W 4/24* (2013.01); *H04W 8/02* (2013.01); *H04W 8/12* (2013.01); *H04W 12/06* (2013.01); *H04W 36/14* (2013.01); *H04W 84/12* (2013.01)

(58) Field of Classification Search
CPC ............ H04M 15/8083; H04W 12/06; H04W 36/0038; H04W 36/14; H04W 4/24; H04W 84/12; H04W 8/02; H04W 8/12; H04W 12/08; H04W 88/08; H04W 48/14; H04W 8/18; H04W 4/02
USPC ........................................................ 370/331
See application file for complete search history.

(56) References Cited

U.S. PATENT DOCUMENTS

| | | | | |
|---|---|---|---|---|
| 2005/0169191 | A1* | 8/2005 | Cheong | H04L 12/66 370/252 |
| 2005/0226423 | A1* | 10/2005 | Li | H04L 63/062 380/278 |
| 2006/0268799 | A1* | 11/2006 | Huang | H04W 88/06 370/338 |
| 2008/0148359 | A1* | 6/2008 | Kezys | H04L 63/0428 726/4 |
| 2009/0170469 | A1* | 7/2009 | Tuli | H04M 15/00 455/406 |
| 2009/0290489 | A1* | 11/2009 | Wang | H04W 28/06 370/230 |
| 2010/0040022 | A1* | 2/2010 | Lindstrom | H04W 36/0055 370/331 |
| 2012/0036560 | A1* | 2/2012 | Wang | H04W 12/06 726/4 |

FOREIGN PATENT DOCUMENTS

| | | |
|---|---|---|
| KR | 10-2004-0025051 A | 3/2004 |
| KR | 10-2004-0051260 A | 6/2004 |
| KR | 10-2004-0104411 A | 12/2004 |

* cited by examiner

METHOD AND DEVICE FOR ACCOUNTING IN WIFI ROAMING BASED ON AC AND AP INTERWORKING

CROSS-REFERENCE TO RELATED APPLICATION

This application is a national stage entry of the PCT application no. PCT/KR2011/007774 filed on Oct. 19, 2011, which claims the benefit of priority from Korean Patent Application No. 10-2011-0093277, filed on Sep. 16, 2011 in the Korean Intellectual Property Office, the disclosures of which are incorporated herein by reference in their entirety.

BACKGROUND

1. Field

Exemplary embodiments relate to a method and an apparatus for operating Wireless Fidelity (WiFi) roaming, and more particularly, to a method and an apparatus for operating WiFi roaming, which can efficiently process authentication and accounting so that the load of an authentication server (RADIUS server) is reduced in a WiFi roaming scheme in which a station session management function and a traffic control function are separated by a Access Controller (AC) and a Access Point (AP) which interwork with each other in a tunneling manner according to a Control and Provisioning of Wireless Access Points (CAPWAP) protocol.

2. Description of the Related Art

A Wireless Fidelity (WiFi) roaming system is a type of Wireless Local Area Network (WLAN) based on IEEE 802.11a/b/g/n standards, and provides a high-speed wireless data service to mobile stations located within a predetermined distance from an Access Point (AP) which is a wireless access relay device.

In such a WiFi roaming scheme using an AP, the AP generally takes charge of both a station session management function and a traffic control function according to a Lightweight Access Point Protocol (LWAPP), but an Access Controller (AC) interworks with the AP in a tunneling manner with the introduction of a CAPWAP protocol and takes charge of the station session management function, thus reducing the load of the AP and smoothly providing a high-speed wireless data service to mobile stations.

However, upon processing accounting aspect of the service, the AP generally interworks with an authentication server (Remote Authentication Dial-In User Services: RADIUS server) to process the accounting aspect of the service. As a result, there is a problem in that, in particular, whenever a mobile station accesses a new AP due to the movement of the station, the new AP frequently generates traffic related to authentication and accounting, thus increasing the load of the AP and the authentication server (RADIUS server).

SUMMARY

Accordingly, an aspect of exemplary embodiments is to provide a method and an apparatus for operating WiFi roaming, which can omit re-authentication when a mobile station accesses a new AP because an access controller (AC) and the AP interwork with each other in a tunneling manner even if they are not present in the same subnet, and which can efficiently perform authentication and accounting so that the load of an authentication server (RADIUS server) is reduced by allowing only a minimum of accounting messages to be generated for the authentication server (RADIUS server) in such a way that duplicated sessions with a past (old) AP and a new AP are maintained, and accounting information is accumulated after the station has completed access to the new AP, or by allowing only a minimum of accounting messages to be generated for the authentication server (RADIUS server) in such a way that when the station moves to a new AP, a session with an old AP is immediately released, and accounting information is accumulated.

According to an aspect of an exemplary embodiment, a method of operating WiFi roaming via an Access Controller (AC) on a network interworking with an Access Point (AP) supporting a wireless Internet service of a mobile station includes receiving an access request of a mobile station from the AP, in response to the received request, allocating an Internet Protocol (IP) address to the mobile station and initiating accounting by an authentication server via authentication of the mobile station while communicating with the authentication server over a network, and permitting access of the mobile station to the AP. When the mobile station is moved to a different location and requests access to a new AP, access of the mobile station to the new AP is permitted based on station information stored in relation to access to the AP without re-authentication of the mobile station.

The method of operating WiFi roaming may further include if use of a wireless Internet service by the mobile station via the new AP is initiated after access to the new AP has been permitted, releasing access of the mobile station to the AP, receiving accounting information from the AP, and accumulating accounting information of the mobile station including the received accounting information.

The method of operating WiFi roaming may further include receiving an access request of the mobile station from the new AP before said access to the new AP is permitted, releasing access of the mobile station to the AP, receiving accounting information from the AP, and accumulating accounting information of the mobile station including the receiving accounting information, and permitting access of the mobile station to the new AP based on the station information stored in relation to access to the AP without re-authentication of the mobile station.

The method of operating WiFi roaming may further include, after said access to the AP or the new AP has been permitted, notifying the mobile station and the corresponding AP of an encryption key to implement wireless security, wherein the mobile station may access the corresponding AP using the encryption key and may use the wireless Internet service.

Accounting information, received and accumulated from a plurality of APs accessed by the mobile station while the mobile station is moving, may be periodically transmitted to the authentication server, and the authentication server may statistically process the received accounting information for each mobile station.

The AC may transmit the accumulated accounting information to the authentication server at predetermined time intervals, or the AC may transmit the accumulated accounting information to the authentication server in response to a request of the authentication server.

Further, an Access Controller (AC) for supporting operation of WiFi roaming while interworking with an Access Point (AP) supporting a wireless Internet service of a mobile station according to another aspect of an exemplary embodiment includes an authenticator configured to allocate an Internet Protocol (IP) address to a mobile station when an access request of the mobile station is received from an AP, and configured to initiate accounting by an authentication server via authentication of the mobile station while communicating with the authentication server over a network, and thereafter configured to permit access of the mobile station to the AP; and a database (DB) configured to store information about each mobile station, access of which to the AP is permitted, wherein the authenticator is further configured to, when the mobile station is moved to a different location and attempts to access a new AP, permit access of the mobile station to the new AP based on station information stored in the DB in relation to access to the AP without re-authenticating the mobile station.

The AC may further include an accounting processor, wherein, after access to the new AP has been permitted, the authenticator is configured to, if use of a wireless Internet service by the mobile station via the new AP is initiated, release access of the mobile station to the AP, and wherein the accounting processor receives accounting information from the AP and accumulates accounting information of the mobile station.

Before access to the new AP is permitted, the authenticator is configured to, if an access request of the mobile station is received from the new AP, release access of the mobile station to the old AP, and wherein the accounting processor is configured to receive accounting information from the AP and configured to accumulate accounting information of the mobile station, and thereafter the authenticator is configured to permit access of the mobile station to the new AP based on the station information stored in relation to access to the AP without re-authenticating the mobile station.

The AC may further include a security processor configured to, after access to the AP or the new AP has been permitted, notify the mobile station and the corresponding AP of an encryption key to implement wireless security, wherein the mobile station is configured to access the corresponding AP using the encryption key and configured to use the wireless Internet service.

According to one or more aspects of exemplary embodiments, re-authentication can be omitted when a mobile station accesses a new AP because an AC and the AP interwork with each other in a tunneling manner even if they are not present in the same subnet, and the AC can be operated such that only a minimum of accounting messages are generated for the authentication server (RADIUS server) in such a way that, when the station accesses a new AP, duplicated sessions with a past (old) AP and the new AP are maintained, and accounting information is accumulated after the station has completed access to the new AP or, alternatively, the AC can be operated such that only a minimum number of accounting messages are generated for the authentication server (RADIUS server) in such a way that when the station moves to a new AP, a session with an old AP is immediately released, and accounting information is accumulated, thus reducing the load of the authentication server (RADIUS server) caused by the processing of authentication and accounting when the station accesses the new AP.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Exemplary embodiments will be described in detail with reference to the attached drawings. This, however, does not restrict the inventive concept to certain exemplary embodiments, and shall be construed as including all permutations, equivalents, and substitutes covered by various exemplary embodiments.

Figure 1:
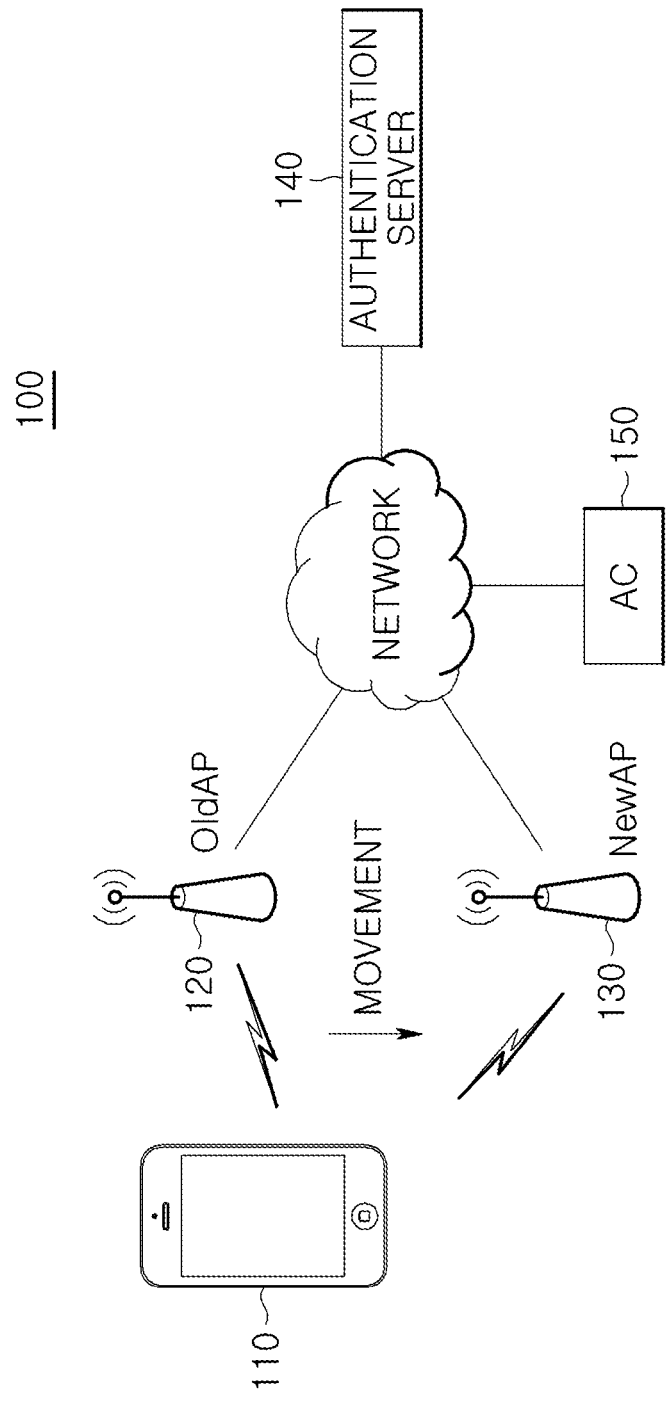
FIG. 1 is a diagram showing a communication system for operating WiFi roaming according to an exemplary embodiment.

FIG. 1 is a diagram showing a communication system 100 for operating WiFi roaming according to an exemplary embodiment.

Referring to FIG. 1, the communication system 100 for operating WiFi roaming according to an exemplary embodiment includes a mobile station (mobile terminal) 110, wireless Access Points (APs) 120 and 130, an authentication server 140, and an Access Controller (AC) 150.

The wireless APs 120 and 130, the authentication server 140, and the AC 150 interwork with each other over a network, and the mobile station 110 receives a wireless Internet service supported by the AC 150 and the AP 120/130 interworking with each other in a tunneling manner over the network according to a Control and Provisioning of Wireless Access Points (CAPWAP) protocol, accesses the network, and is capable of being provided with a required data service while communicating with other user mobile stations, an Internet server, etc. In order to support the wireless Internet service, the AP 120/130 takes charge of a traffic control function and the AC 150 takes charge of a station session management function, thus reducing the load of the AP 120/130 for WiFi roaming. The network may be the Internet, and may include a wireless mobile communication network, such as a WCDMA or Wibro network operated by a mobile carrier, or a wired telephone network.

The AC 150 may be present in the same subnet being under the routing control of the same router as that of the wireless APs 120 and 130, or may be present in another subnet being under the routing control of other routers connected (routed connection) to a subset to which the wireless APs 120 and 130 are connected.

In an exemplary embodiment, the authentication server 140 corresponds to an authentication and accounting server which performs services such as Remote Authentication Dial-In User Services (RADIUS) taking charge of authentication and accounting in the mobile communication network, and is configured to manage the Medium Access Control (MAC) addresses of subscriber mobile stations in a database (DB) such as a hardware memory, initiate accounting if the authentication of the MAC address of the corresponding mobile station has succeeded at the request of the AC 150, receive accounting-related information from the AC 150 during a period in which the mobile station 110 uses the service, and then process accounting statistics.

In an exemplary embodiment, the mobile station 110, which is a terminal configured to access the network (for example, the Internet) according to a WiFi protocol via wireless APs, and configured to utilize a data service, such as, but is not limited to, a smart phone (e.g., an iPod or an android phone), a portable or mobile station configured to communicate via wireless APs, (e.g., a cellular phone, a Personal Communications Service (PCS) phone, synchronous/asynchronous International Mobile Telecommunication-2000 (IMT-2000) enabling wireless communication, a Personal Digital Assistant (PDA), a Wireless Application Protocol (WAP) phone, a mobile play-station, and a Portable Multimedia Player (PMP)), a notebook personal computer (PC), a desktop PC, or a palm PC, or various types of widely-used electronic appliances or devices for home use or business use configured to communicate with other electronic devices.

In particular, in an exemplary embodiment, the AC 150, which supports the operation of WiFi roaming while interworking with the APs 120 and 130 over the network, relays the authentication of the mobile station 110 between the mobile station 110 and the authentication server 140, allocates an Internet Protocol (IP) address, and interworks with the APs 120 and 130 in a tunneling manner even if the AP 150 is not present in the same subnet as that of the APs 120 and 130 upon controlling access to the APs 120 and 130, so that, when the mobile station is moved from the old AP 120 previously accessed by the station to access the new AP 130, re-authentication performed by exchanging traffic with the authentication server 140 is omitted, thus reducing the load of the authentication server 140. Further, the AC 150 can be operated such that only a minimum number of accounting messages are generated for the authentication server 140 when the mobile station 110 is moved from the old AP 120 to access the new AP 130. In an exemplary embodiment, duplicated sessions with the old AP 120 and the new AP 130 are maintained and accounting information is accumulated after access to the new AP 130 has been completed. Alternatively, in an exemplary embodiment, the AC 150 can be operated such that only a minimum number of accounting messages are generated for the authentication server 140 when the station is moved to the new AP 130, a session with the old AP 120 is immediately released and accounting information is accumulated. Accordingly, when the station accesses the new AP 130, the load of the authentication server (RADIUS server) caused by the processing of authentication and accounting may be reduced.

Figure 2:
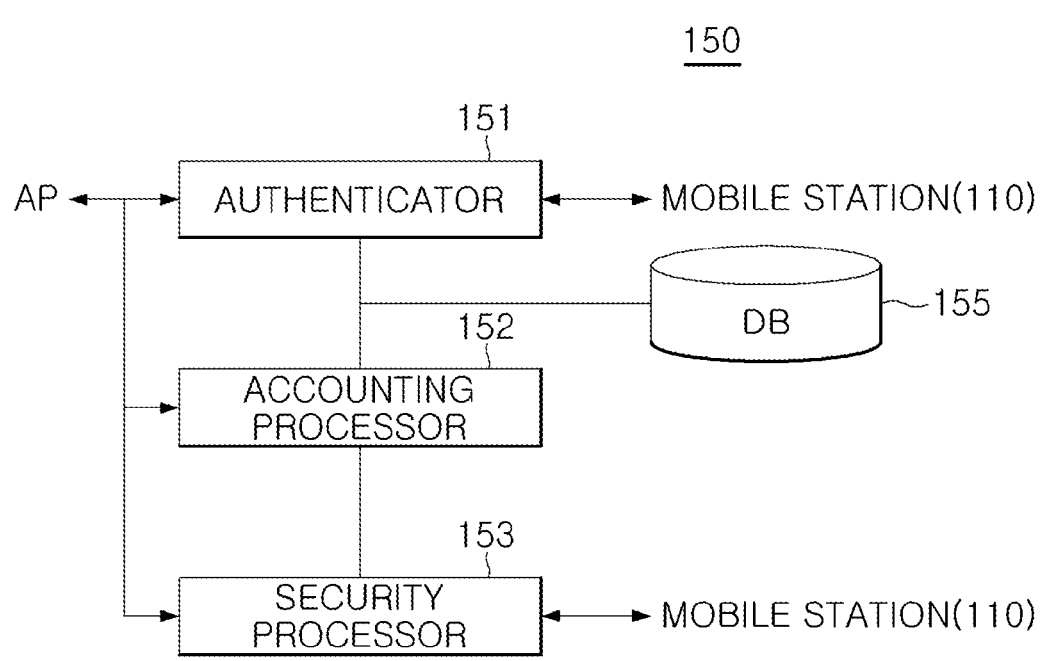
FIG. 2 is a diagram showing a configuration of an Access Controller (AC) according to an exemplary embodiment.

In an exemplary embodiment, an AC 150 may be configured as shown in FIG. 2. Referring to FIG. 2, the AC 150 according to an exemplary embodiment includes an authenticator 151, an accounting processor 152, a security processor 153, and a database (DB) 155. The components of the AC 150 may be implemented using software, hardware, or combinations thereof, wherein only a minimum of components are shown so as to describe principal functions. In an exemplary embodiment, the authenticator, 151, accounting processor 152, and security processor 153 may be one or more processors executing instructions for performing operations described below.

The operation of the AC 150 in the communication system 100 for operating WiFi roaming according to an exemplary embodiment will be described briefly with reference to FIG. 2, and a detailed operation thereof will be described in detail later with reference to the flowcharts of FIGS. 3 and 4.

In FIG. 2, the authenticator 151 is configured to, if the access request (association request) of the mobile station 110 is received from the AP (e.g., 120), allocate an IP address to the mobile station 110, perform control such that accounting is initiated by the authentication server 140 via the authentication of the corresponding mobile station (for example, authentication of a MAC address) while communicating with the authentication server 140 over the network, and thereafter permit the access of the mobile station to the AP (e.g., 120).

The authenticator 151 stores and manages information about each mobile station (e.g., the MAC address or the like of the station), which of the APs (e.g., 120) each mobile station is permitted to access. The information may be stored in the database (DB) 155, and may permit access of the station to a new AP (e.g., 130) based on the station information stored in the DB 155 in relation to the access to the old AP (e.g., 120), without re-authenticating the mobile station when the mobile station 110 is moved and attempts to access the new AP (e.g., 130).

Figure 3:
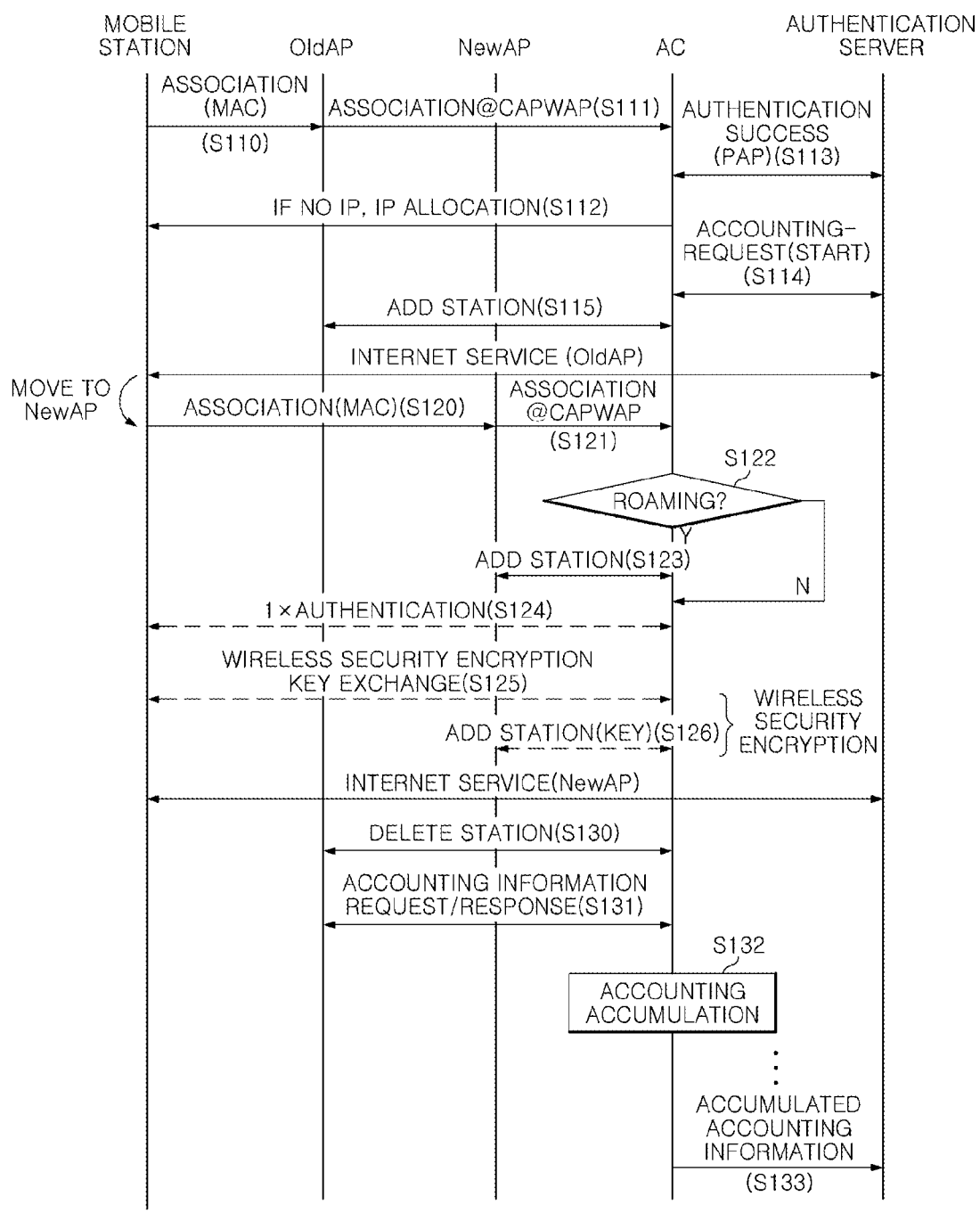
FIG. 3 is a flowchart showing an accounting processing method for a movement of a mobile station when duplicated sessions are permitted according to an exemplary embodiment.

After access to the new AP (e.g., 130) has been permitted, if the use of a wireless Internet service by the mobile station 110 via the new AP (e.g., 130) is initiated, the authenticator 151 releases the access of the mobile station 110 to the old AP (e.g., 120), and the accounting processor 152 receives accounting information from the old AP (e.g., 120), and gradually accumulates the accounting information of the corresponding mobile station in the DB 155 (as explained in greater detail with reference to FIG. 3).

In addition, accounting may be processed in another manner, as explained in greater detail with reference to FIG. 4. For example, if the authenticator 151 receives the access request of the mobile station 110 from a new AP (e.g., 130) before access to the new AP (e.g., 130) is permitted by the authenticator 151, the authenticator 151 first releases access of the mobile station to the old AP (e.g., 120), and the accounting processor 152 receives accounting information from the old AP (e.g., 120) and accumulates the accounting information of the mobile station, and thereafter the authenticator 151 may permit access of the mobile station to the new AP (e.g., 130) based on the station information stored in the DB 155 in relation to the access to the old AP (e.g., 120) without re-authenticating the corresponding mobile station.

Meanwhile, after permitting access to the old AP (e.g., 120) or the new AP (e.g., 130) according to an exemplary embodiment, the security processor 153 may notify the mobile station 110 and the AP 120/130 of an encryption key to implement wireless security, and the mobile station 110 may access the AP 120/130 using the encryption key notified by the security processor 153 and may use a wireless Internet service.

Hereinafter, the operation of the communication system 100 for operating WiFi roaming according to an exemplary embodiment will be described in greater detail with reference to flowcharts of FIGS. 3 and 4.

FIG. 3 is a flowchart showing an accounting processing method for a movement of a mobile station when duplicated sessions are permitted according to an exemplary embodiment.

When the user of the mobile station 110 desires to use a wireless Internet service in an area in which a wireless AP is installed, the mobile station 110 sends an access request message (association) to the closest AP (e.g., 120)(in operation S110), and the AP (e.g., 120) transfers the message to the AC 150 (in operation S111). The access request message (association) includes the MAC address of the mobile station 110, and may additionally include parameters, such as the MAC address of a destination (e.g., 120), required to request the wireless Internet service.

Accordingly, the authenticator 151 of the AC 150 determines whether the mobile station 110 (MAC address) is roaming (the access of the mobile station has already been permitted), allocates an IP address to the mobile station if there is no IP address allocated (in operation S112), and performs the authentication of the corresponding mobile station (for example, authentication of a MAC address) via communication with the authentication server 140 over the network (in operation S113). That is, the authenticator 151 of the AC 150 requests authentication from the authentication server 140 by sending a message including the MAC address of the mobile station 110 to the authentication server 140. The authentication server 140 responds by sending authentication success information to the AC 150 if the corresponding information is present in MAC addresses of respective subscriber mobile stations managed in the DB according to a Password Authentication Protocol (PAP)(in operation S113), sends a message indicating that accounting for the station 110 has started, and receives a required response (accounting request), thus allowing the accounting processor 152 of the AC 150 to accumulate and report the accounting information (in operation S114).

After the authenticator 151 of the AC 150 performs control such that the authentication server 140 starts accounting via the authentication of the mobile station 110 while communicating with the authentication server 140 over the network, the authenticator 151 exchanges messages (ADD Station) required to permit access of the mobile station 110 to the AP (e.g., 120)(in operation S115), so that the mobile station 110 may access the network via the AP (e.g., 120) using the allocated IP address and may then use the wireless Internet service. The authenticator 151 may store and manage information about the station (e.g., the MAC address or the like of the station), the access of which to the AP (e.g., 120) is permitted, in the DB 155.

In this way, while the user is using the wireless Internet service via the mobile station 110, the user may move to another adjacent area or the like. Thus, if the mobile station 110 deviates from the area covered by the old AP (e.g., 120), and a new AP (e.g., 130) is installed at the corresponding location, the mobile station 110 may attempt to access the new AP (e.g., 130) (in operations S120 and S121). In this case, the authenticator 151 may perform determination based on the station information stored in the DB 155 in relation to the access to the old AP (e.g., 120) (in operation S122), and permit access to the new AP (e.g., 130) without re-authenticating the corresponding mobile station (in operation S123).

That is, at operation S120, the mobile station 110 may send an access request message (association) to the new AP (e.g., 130) so as to attempt to access the new AP (e.g., 130), and the new AP (e.g., 130) transfers the message to the AC 150 (in operation S121). The access request message (association) includes the MAC address of the mobile station 110 and may additionally include parameters, such as the MAC address of a destination (e.g., 130), required to request the wireless Internet service.

Accordingly, the authenticator 151 of the AC 150 determines whether the mobile station (MAC address) is roaming (access has already been permitted), with reference to the station information (the MAC information of the station related to the access to the old AP (e.g., 120)) stored in the DB 155 (in operation S122). That is, if information about the access of the mobile station to the old AP (e.g., 120) is present in the DB 155, the authenticator 151 may permit access to the new AP (e.g., 130) without re-authenticating the mobile station (in operation S123). That is, the authenticator 151 of the AC 150 exchanges messages (ADD Station) required to permit access of the mobile station 110 to the new AP (e.g., 130) (in operation S123), and then the mobile station 110 may use the wireless Internet service by accessing the network via the new AP (e.g., 130) using the allocated IP address. The authenticator 151 may also update information about the station, the access of which to the new AP (e.g., 130) is permitted (e.g., the MAC address or the like of the station) and may store and manage the station information in the DB 155.

Meanwhile, if it is not determined that the mobile station is roaming in operation S122, and the information of the mobile station which accessed the old AP (e.g., 120) is not present in the DB 155, the authenticator 151 of the AC 150 recognizes that mobile station accesses the new AP (e.g., 130) first and has not accessed the old AP 120, and may perform the IP allocation and authentication procedure and the access permission procedure, such as the one above-described in operations S112, S113, S114, and S115 (in operation S124).

Further, as described above, according to an exemplary embodiment, after access to the old AP (e.g., 120) has been permitted in operation S115 or after access to the new AP (e.g., 130) has been permitted in operation S123, the security processor 153 may perform a procedure for wireless security processing (in operations S125 and S126) (this procedure may be omitted). For example, the security processor 153 of the AC 150 may notify the mobile station 110 of an encryption key for wireless security and receive a response (Key Exchange)(in operation S125), and may also notify the AP 120/130 of the corresponding encryption key (in operation S126). The encryption key for wireless security may be a 64-bit or 128-bit encryption key for communication which is used for an improved wireless security algorithm based on a WiFi Protected Access (WPA)/WPA2 protocol.

Accordingly, the mobile station 110 may use the wireless Internet service by accessing the network via the new AP (e.g., 130) using the allocated IP address. If the encryption key required for wireless security processing is notified as described above in an exemplary embodiment, the mobile station 110 may transmit or receive data using the corresponding encryption key upon utilizing the wireless Internet service, and the new AP (e.g., 130) may allow the mobile station 110 to use the wireless Internet service after decrypting the corresponding encryption key.

Meanwhile, after the access of the mobile station 110 to the new AP (e.g., 130) has been permitted, if the use of the wireless Internet service by the mobile station 110 via the new AP (e.g., 130) is initiated, the authenticator 151 releases access of the mobile station 110 to the old AP (e.g., 120) (in operation S130 i.e., delete station), and the accounting processor 152 of the AC 150 receives accounting information from the old AP (e.g., 120) (in operation S131), and gradually accumulates the accounting information of the corresponding mobile station (in operation S132).

For example, the mobile station 110 may move to a different location. After access of the mobile station 110 to another new AP is permitted at the corresponding movement location via the above-described exemplary procedure, if the use of a wireless Internet service by the mobile station 110 via the new AP is initiated, the authenticator 151 releases access of the mobile station 110 to the old AP, and the accounting processor 152 of the AC 150 receives accounting information from the old AP and accumulates the accounting information of the mobile station. In this way, whenever the mobile station 110 moves and gains access to a new AP, the accounting processor 152 of the AC 150 receives accounting information from the old AP, and gradually accumulates the accounting information of the mobile station.

In this way, according to an exemplary embodiment, the accounting processor 152 may manage accounting information (information required for accounting, such as the MAC address of the station, date, and time) received and accumulated from a plurality of APs accessed by the mobile station 110 while the mobile station 110 is moving, and may send a minimum number of accounting messages to the authentication server 140 depending on a predetermined notification scheme (in operation S133). For example, the accounting processor 152 may periodically transmit the accumulated accounting information to the authentication server 140 at regular time periods (e.g., hours, days, weeks, etc.). In this case, the accounting processor 152 may transmit the accumulated accounting information to the authentication server 140 by autonomously checking whether a predetermined time period has expired, or may transmit accounting information, accumulated by a particular point in time by the accounting processor 152 of the AC 150, to the authentication server 140 in response to the request of the authentication server 140 when the authentication server 140 requests the information, depending on the circumstances. If the accumulated accounting information is received from the accounting processor 152 of the AC 150, the authentication server 140 may statistically process the received accounting information for each mobile station depending on an accounting bill issuance period (for example, monthly), may manage accounting statistical information related to the number of packets used or the like, and may notify a predetermined server, which charges fees to customers, of the accounting statistical information if necessary.

In this way, according to an exemplary embodiment, when the mobile station 110 accesses the new AP (e.g., 130), the AP 150 is operated such that only a minimum number of accounting messages are generated for the authentication server 140 in such a way that duplicated sessions with the old AP (e.g., 120) and the new AP (e.g., 130) are maintained, and accounting information is accumulated after the station 110 has completed access to the new AP (e.g., 130), thus reducing the load of the authentication server 140 caused by the processing of authentication and accounting when the mobile station 110 accesses the new AP (e.g., 130).

Figure 4:
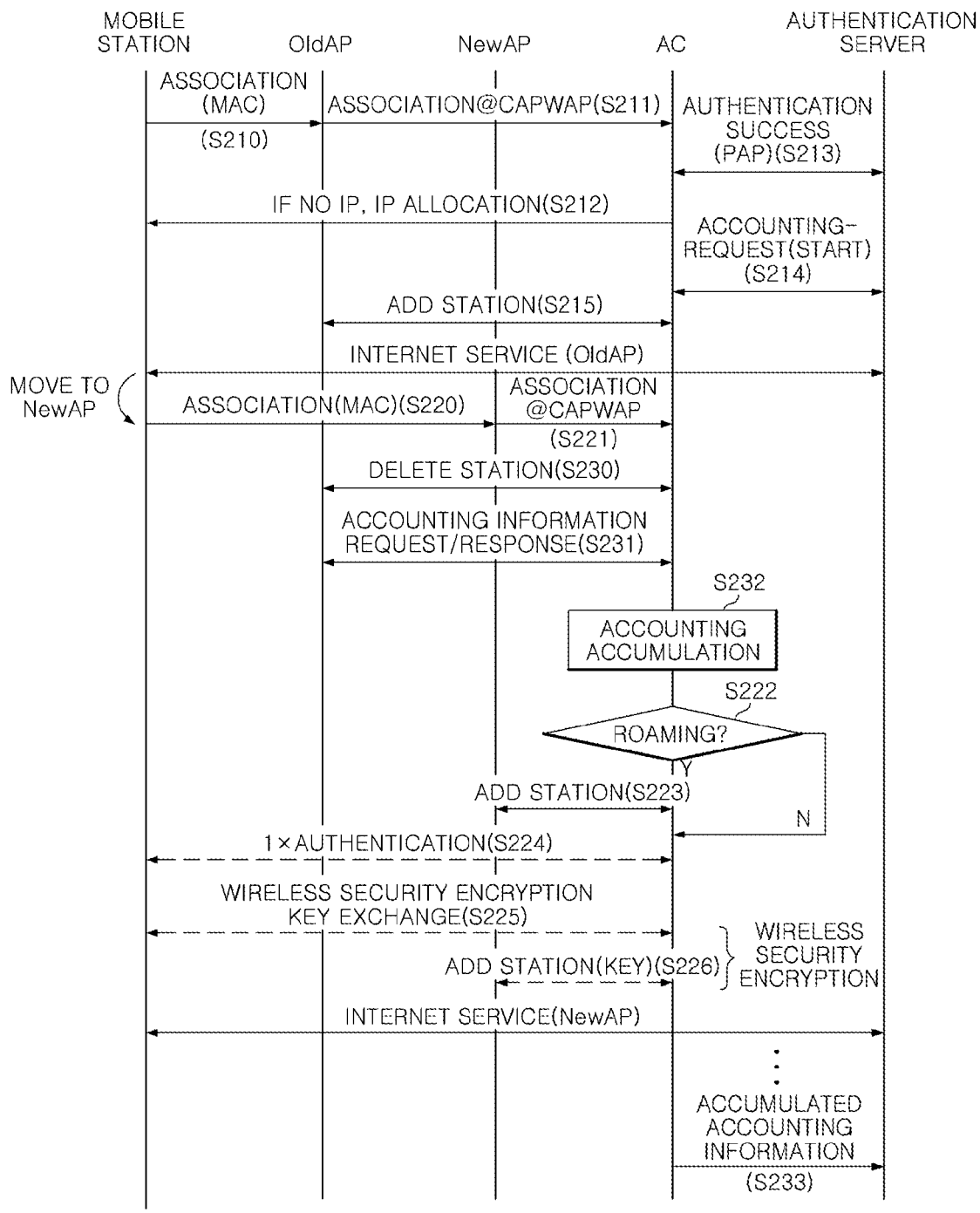
FIG. 4 is a flowchart showing an accounting processing method for a movement of a mobile station when duplicated sessions are not permitted according to an exemplary embodiment.

FIG. 4 is a flowchart showing an accounting processing method for a movement of a mobile station in a case where duplicated sessions are not permitted according to an exemplary embodiment.

FIG. 4 illustrates a method for operating the AC 150 so that only a minimum number of accounting messages are generated for the authentication server 140 in such a way that, when the mobile station 110 is moved to a new AP (e.g., 130), a session to an old AP (e.g., 120) is immediately released, and accounting information is accumulated, thus reducing the load of the authentication server 140 caused by the processing of authentication and accounting.

A procedure including operation S210 to S215, S220, and S221 in FIG. 4 are similar to that of operations S110 to S115, S120, and S121 in FIG. 3. Further, a procedure including operations S230 to S232 in FIG. 4 are similar to that of operations of S130 to S132 in FIG. 3. Furthermore, a procedure including operations S222 to S226 and S233 in FIG. 4 are similar to that of operations S122 to S126 and S133 in FIG. 3. That is, the process of FIG. 4 is similar to that of FIG. 3 except that the procedure including operations S230 to S232 is performed prior to the procedure including operations S222 to S226 (in FIG. 3, the procedure including operations S130 to S132 is performed subsequent to the procedure including operations S122 to S126).

That is, according to the procedure including operations S210 to S215, S220, and S221 (see S110 to S115, S120, and S121 of FIG. 3), the mobile station 110 may deviate from the area covered by the old AP (e.g., 120) and attempt to access the new AP (e.g., 130) at the corresponding location.

In this case, in an exemplary embodiment, if the access request (association) of the mobile station 110 is received from the new AP (e.g., 130) before access to the new AP (e.g., 130) is permitted by the authenticator 151, the authenticator 151 first releases access of the mobile station to the old AP (e.g., 120) (in operation S230, delete station), and the accounting processor 152 of the AC 150 receives accounting information from the old AP (e.g., 120) (in operation S231), and gradually accumulates the accounting information of the corresponding mobile station (in operation S232).

For example, the mobile station 110 may again move to a different location. Before access of the mobile station to another new AP is permitted at the corresponding movement location via the above procedure, if the access request (association) of the mobile station 110 is received via the new AP, the authenticator 151 first releases access of the mobile station 110 to the old AP, and the accounting processor 152 of the AC 150 receives accounting information from the old AP, and gradually accumulates the accounting information of the corresponding mobile station. In this way, whenever the mobile station 110 moves and gains access to a new AP, the accounting processor 152 of the AC 150 receives accounting information from the old AP, and gradually accumulates the accounting information of the corresponding mobile station.

Meanwhile, as described above, according to an exemplary embodiment, while the accounting processor 152 of the AC 150 accumulates the accounting information, the authenticator 151 may perform determination based on the station information stored in the DB 155 in relation to the access to the old AP (e.g., 120)(in operation S222), and thus permit access to the new AP (e.g., 130) without re-authenticating the corresponding mobile station (in operation S223).

That is, in operation S220, the mobile station 110 may send an access request message (association) to the new AP (e.g., 130) so as to attempt to access the new AP (e.g., 130), and the new AP (e.g., 130) transfers the message to the AC 150 (in operation S221). The access request message (association) includes the MAC address of the mobile station 110 and may additionally include parameters, such as the MAC address of a destination (e.g., 120), required to request the wireless Internet service.

Accordingly, the authenticator 151 of the AC 150 determines whether the mobile station (MAC address) is roaming (access has already been permitted), with reference to the station information (the MAC information of the station related to the access to the old AP (e.g., 120)) stored in the DB 155 (in operation S222). That is, if information about access of the mobile station to the old AP (e.g., 120) is present in the DB 155, the authenticator 151 may permit access to the new AP (e.g., 130) without re-authenticating the mobile station (in operation S223). That is, the authenticator 151 of the AC 150 exchanges messages (ADD Station) required to permit the access of the mobile station 110 to the new AP (e.g., 130) (in operation S223), and then the mobile station 110 may use the wireless Internet service by accessing the network via the new AP (e.g., 130) using the allocated IP address. The authenticator 151 may also update information about the station, the access of which to the new AP (e.g., 130) is permitted (e.g., the MAC address or the like of the station) and may store and manage the station information in the DB 155.

Meanwhile, even in this case, if it is not determined that the mobile station is roaming in operation S222, and the information of the mobile station which accessed the old AP (e.g., 120) is not present in the DB 155, the authenticator 151 of the AC 150 recognizes that mobile station accesses the new AP (e.g., 130) first and has not accessed the old AP 120, and may perform the IP allocation and authentication procedure and the access permission procedure, such as the ones above-described in operations S212, S213, S214, and S215 (corresponding to S112, S113, S114, and S115 of FIG. 3) (in operation S224).

Further, as described above, in an exemplary embodiment, after access to the old AP (e.g., 120) has been permitted in operation S215 or after access to the new AP (e.g., 130) has been permitted in operation S223, the security processor 153 may perform a procedure for wireless security processing (in operations S225 and S226) (this procedure may be omitted). For example, the security processor 153 of the AC 150 may notify the mobile station 110 of an encryption key for wireless security and receive a response (Key Exchange)(S225), and may also notify the AP 120/130 of the corresponding encryption key (in operation S226). The encryption key for wireless security may be a 64-bit or 128-bit encryption key for communication which is used for an improved wireless security algorithm based on a WiFi Protected Access (WPA)/WPA2 protocol.

Accordingly, in an exemplary embodiment, the mobile station 110 may use the wireless Internet service by accessing the network via the new AP (e.g., 130) using the allocated IP address. If the encryption key required for wireless security processing, the encryption key is provided as described above, the mobile station 110 may transmit or receive data using the corresponding encryption key upon utilizing the wireless Internet service, and the new AP (e.g., 130) may allow the mobile station 110 to use the wireless Internet service after decrypting the corresponding encryption key.

By using the above procedure, according to an exemplary embodiment, if the authenticator 151 receives the access request (association) of the mobile station 110 via another new AP before access to the new AP is permitted at the corresponding moved location whenever the mobile station 110 is moved, the authenticator 151 first releases the access of the mobile station 110 to the old AP, and the accounting processor 152 of the AC 150 may repeatedly perform a procedure for permitting access of the mobile station 110 to a further AP when receiving accounting information from the old AP and accumulating the accounting information of the corresponding mobile station.

In this way, whenever the mobile station 110 moves and gains access to a new AP, the accounting processor 152 of the AC 150 may receive accounting information from the old AP and gradually accumulate the accounting information of the mobile station, and may manage accounting information (information required for accounting, such as the MAC address of the station, date, and time) received and accumulated from a plurality of APs accessed by the mobile station 110 while the mobile station 110 is moving, and then send a minimum of accounting messages to the authentication server 140 depending on a predetermined notification scheme (in operation S233). For example, the accounting processor 152 may periodically transmit the accumulated accounting information to the authentication server 140 at regular time periods (e.g., hours, days, weeks, etc.). In this case, the accounting processor 152 may transmit the accumulated accounting information to the authentication server 140 by autonomously checking at a predetermined time period, or may transmit accounting information, accumulated up to a particular point in time by the accounting processor 152 of the AC 150, to the authentication server 140 in response to the request of the authentication server 140 when the authentication server 140 requests the information, depending on the circumstances. If the accumulated accounting information is received from the accounting processor 152 of the AC 150, the authentication server 140 may statistically process the received accounting information for each mobile station depending on an accounting bill issuance period (for example, monthly), may manage accounting statistical information related to the number of packets used or the like, and may notify a predetermined server, which charges fees to customers, of the accounting statistical information if necessary.

Although exemplary embodiments have been described with reference to drawings, inventive concept is not limited by those exemplary embodiments, and those skilled in the art will appreciate that various changes and modifications are possible without departing from the technical ideas and scope of exemplary embodiments. For example, both the traffic of control/data channels for the above-described session management (authentication/accounting, etc.) and user traffic generated when the mobile station 110 uses an Internet service may be transmitted and received via the AC 150 using a central processing scheme. Depending on the circumstances, by using a distributed processing scheme for load distribution, user traffic generated when the mobile station 110 uses the Internet service may be directly transmitted and received over a network, such as an L2 switch and a router, without passing through the AC 150, and only the traffic of control/data channels for session management may be transmitted and received through the AC 150. Therefore, the scope of inventive concept should not be limited by the above-described exemplary embodiments and should be defined by the accompanying claims and equivalents thereof.

The invention claimed is:

1. A method, of operating WiFi roaming, performed by an access controller (AC), the method comprising:
  receiving an access request of a mobile station from an first access point (AP);
  in response to the receiving the access request, allocating an Internet Protocol (IP) address to the mobile station and initiating accounting by controlling an authentication server via authentication of the mobile station while communicating with the authentication server over a network;
  permitting access of the mobile station to the first AP;
  receiving, from a second AP, a request for access of the mobile station when the mobile station moves to a different location;
  receiving, from the first AP, accounting information comprising an amount of data usage of the mobile station via the first AP;
  receiving from a third AP, a request for access of the mobile station when the mobile station moves to a different location;
  receiving, from the second AP, accounting information comprising an amount of data usage of the mobile station via the second AP;
  accumulating the accounting information received from the first AP and the second AP of the mobile station; and after permitting access of the mobile station to at least the third AP, transmitting, at regular intervals during at least one of a plurality of regular periods, the accumulated accounting information from the first AP and the second AP to the authentication server,
wherein, access of the mobile station to the second AP and the third AP is permitted based on station information stored in relation to access to the first AP without re-authentication of the mobile station.

2. The method of claim 1, further comprising:
if use of a wireless Internet service by the mobile station via the second AP is initiated after access to the second AP has been permitted, releasing access of the mobile station to the first AP.

3. The method of claim 1, further comprising:
receiving an access request of the mobile station from the second AP before said access to the second AP is permitted; and
releasing access of the mobile station to the first AP.

4. The method of claim 1, further comprising:
after said access to the first AP or the second AP has been permitted, notifying the mobile station and the corresponding AP of an encryption key to implement wireless security; and
accessing, by the mobile station, the corresponding AP using the encryption key and using the wireless Internet service.

5. The method of claim 1, wherein accounting information, received and accumulated from a plurality of APs accessed by the mobile station while the mobile station is moving, is periodically transmitted to the authentication server, and wherein the authentication server statistically processes the received accounting information for each mobile station.

6. The method of claim 5, further comprising one of:
transmitting, by the AC, the accumulated accounting information to the authentication server, wherein the transmitting is at predetermined intervals, or
receiving a request for the accumulated accounting information from the authentication server and transmitting, by the AC, the accumulated accounting information to the authentication server in response to the request.

7. An Access Controller (AC) for supporting operation of WiFi roaming, comprising:
an authenticator configured to allocate an Internet Protocol (IP) address to a mobile station when an access request of the mobile station is received from a first access point (AP), and configured to initiate accounting by controlling an authentication server via authentication of the mobile station while communicating with the authentication server over a network, and configured to permit access of the mobile station to the first AP after the authentication is successful, and configured to, when the mobile station is moved and requests access to a second AP, permit access of the mobile station to the second AP, and configured to, when the mobile station is moved and requests access to a third AP, permit access of the mobile station to the third AP;
a database (DB) configured to store information about each mobile station, access of which to the first AP is permitted; and
an accounting processor configured to receive, from the first AP, accounting information, comprising an amount of data usage of the mobile station via the first AP, and configured to receive, from the second AP, accounting information, comprising an amount of data usage of the mobile station via the second AP, and configured to accumulate the accounting information received from the first AP and the second AP, and configured to, after permitting access of the mobile station to at least the third AP, transmit, at regular intervals during at least one of a plurality of regular periods, the accumulated accounting information from the first AP and the second AP to the authentication server, wherein the authenticator is further configured to permit access of the mobile station to the second AP and the third AP based on station information stored in the DB in relation to access to the first AP without re-authenticating the mobile station, and
wherein the accounting processor is further configured to receive the accounting information from the first AP after the authenticator receives, from the second AP, a request for access of the mobile station to the second AP, and
wherein the accounting processor is further configured to receive the accounting information from the second AP after the authenticator receives, from the third AP, a request for access of the mobile station to the third AP.

8. The AC of claim 7, wherein, after said access to the second AP is permitted, the authenticator is further configured to, if use of a wireless Internet service by the mobile station via the second AP is initiated, release access of the mobile station to the first AP.

9. The AC of claim 7, wherein, before access to the second AP is permitted, the authenticator is configured to, if an access request of the mobile station is received from the second AP, release access of the mobile station to the first AP.

10. The AC of claim 7, further comprising a security processor configured to, after access to the first AP or the second AP has been permitted, notify the mobile station and the corresponding AP of an encryption key to implement wireless security,
wherein the mobile station accesses the corresponding AP using the encryption key and uses the wireless Internet service.

11. A method, of operating WiFi roaming, performed by an access controller (AC), the method comprising:
receiving, from a first access point (AP), an access request of a mobile station;
in response to the receiving the access request, allocating an Internet Protocol (IP) address to the mobile station and initiating accounting by controlling an authentication server;
permitting access of the mobile station to the first AP based on the allocating and the accounting;
receiving, from a second AP, a request for access of the mobile station when the mobile station moves to a different location;
permitting access of the mobile station to the second AP based on the allocating and the accounting with respect to the first AP;
receiving, from the first AP, accounting information comprising an amount of data usage of the mobile station via the first AP;
receiving, from a third AP, a request for access of the mobile station when the mobile station moves to a different location;
permitting access of the mobile station to the third AP based on the allocating and the accounting with respect to the first AP;
receiving, from the second AP, accounting information comprising an amount of data usage of the mobile station via the second AP;

accumulating the accounting information received from the first AP and the second AP of the mobile station; and after permitting access of the mobile station to at least the third AP, transmitting, at regular intervals during at least one of a plurality of regular periods, the accumulated accounting from the first AP and the second AP information to the authentication server.

12. The method of claim 11, further comprising:
using a wireless Internet service by the mobile station via the first AP based on said permitting access to the first AP;
using the wireless Internet service by the mobile station via the second AP based on said permitting access to the second AP and releasing said access to the first AP; and
aggregating accounting information of the mobile station for said using the wireless Internet service via the first AP and via the second AP.

13. The method of claim 12, further comprising transmitting the accounting information at predetermined time intervals to the authentication server.

14. The method of claim 13, wherein the first AP and the second AP operate according to a control and provisioning of wireless access points protocol.

15. The AC of claim 7, wherein the AC is in a different subnet from the first AP.

16. The AC of claim 7, wherein the AC is in a subnet, different than a subnet comprising any of the first AP and the second AP.

17. The AC of claim 7, wherein the AC is in a same subnet as a subnet comprising any of the first AP and the second AP.

18. The method of claim 1, wherein the accounting information further comprises a number of network packets used by the mobile station and fees to be charged for said number of network packets.

19. The method of claim 3, wherein the releasing access of the mobile station to the second AP occurs in response to the mobile station being permitted access to the second AP.

20. The method of claim 1, wherein the accounting information for the mobile station is transmitted from the first AP to the authentication server via the AC.

21. The method of claim 1, wherein the accounting information for the mobile station is transmitted from the first AP to the authentication server without transmitting the accounting information to the second AP.

22. The method of claim 1, wherein the AC is further configured to, prior to accumulating the accounting information from the first AP, perform a wireless security encryption key exchange with the mobile station, by adding a station key to the second AP and deleting first AP information from the AC.

* * * * *